United States Patent Office 3,804,783
Patented Apr. 16, 1974

3,804,783
SELF-EXTINGUISHING POLYMER COMPOSITIONS CONTAINING BROMINATED CINNAMIC ACID ESTERS
Hilda Howell and Walter M. Kutz, Pittsburgh, Pa., assignors to Koppers Company, Inc.
No Drawing. Original application July 21, 1971, Ser. No. 164,824, now Patent No. 3,766,249. Divided and this application Dec. 4, 1972, Ser. No. 312,108
Int. Cl. C07c 69/34, 69/76; C08f 45/58
U.S. Cl. 260—2.5 FP                 15 Claims

ABSTRACT OF THE DISCLOSURE

Solid organic polymers normally susceptible to burning are rendered self-extinguishing by incorporating therein an ester of $\alpha,\beta$-dibromodihydrocinnamic acid or $\alpha,\beta$-dibromodihydrocinnamyl alcohol; for example, 2,4-diisopropylphenyl, $\alpha,\beta$ - dibromodihydrocinnamate. The self - extinguishing agents useful in the invention are unexpectedly stable to the hydrolytic conditions of impregnation, yet are highly reactive as self-extinguishing agents.

This is a division of application Ser. No. 164,824, filed July 21, 1971, now U.S. Pat. 3,766,249.

BACKGROUND OF THE INVENTION

Synthetic polymers are in wide use today for a variety of applications. For many of these applications, polymers which are normally flammable must be rendered self-extinguishing for safety purposes. For example, polymer foams such as foam polystyrene are light in weight, have excellent heat insulating properties, and are useful in building construction; but unfortunately, such foams are highly flammable and susceptible to rapid flame-spread. Because of the fire hazard inherent in its use, it is essential in order to meet safety standards that the foam be rendered fire retardant. In the past, certain brominated organic compounds have been utilized for rendering self-extinguishing solid polymer compositions such as the expandable polystyrene foams mentioned above. While many compounds have been found to be effective to render a polymer composition self-extinguishing, when they are used in amount sufficient to achieve the desired degree of fire retardancy, the lumping and static properties of the polymers into which they are incorporated have been adversely affected, thus affecting the molding properties. Also, many of the prior art self-extinguishing compounds tend to be unstable under conditions of impregnation (viz. 10 hours at 90° C. or 6–8 hours at 115° C.); and, when incorporated into the polymer, tend to deteriorate over a period of time and lose their self-extinguishing efficiency.

It is, therefore, desirable to find brominated, organic compounds which do not suffer from the above disadvantages in that they can be incorporated into polymers in amounts sufficient to lend self-extinguishing characteristics to the polymer without harming its molding properties, and which have sufficient stability such that their effectiveness is not lost with the passage of time. According to the invention, it has been found that a class of compounds with these desirable properties are the esters of $\alpha,\beta$-dibromodihydrocinnamic acid or $\alpha,\beta$-dibromodihydrocinnamyl alcohol. The esters of the invention impart anti-lumping and anti-static properties to the expandable polystyrene prepuff materials and aid in the fusion of the particles during molding.

SUMMARY OF THE INVENTION

Solid organic polymer compositions normally susceptible to burning are rendered self-extinguishing by incorporating therein from about 0.1–15% by weight, based on polymer, of an ester of $\alpha,\beta$-dibromodihydrocinnamic acid or $\alpha,\beta$ - dibromodihydrocinnamyl alcohol. Both polymer compositions rendered self-extinguishing according to the invention include poly(alpha-olefins), poly(vinylaromatics), and copolymers thereof.

DETAILED DESCRIPTION

The compounds useful in the invention are esters selected from the group consisting of:

(a) $\alpha,\beta$-dibromodihydrocinnamic acid esters of alkanols having 1 to 5 carbon atoms, benzyl alcohol, phenol, and alkyl-substituted phenols;

(b) mono- and di($\alpha,\beta$ - dibromodihydrocinnamic acid) esters of neopentyl glycol, dibromoneopentyl glycol, resorcinol, and alkyl-substituted resorcinols;

(c) mono, di-, and tri($\alpha,\beta$-dibromodihydrocinnamic acid) esters of trihydroxybenzenes;

(d) $\alpha,\beta$ - dibromodihydrocinnamyl esters of monocarboxylic acids; and (e) di($\alpha,\beta$ - dibromodihydrocinnamyl)esters of dicarboxylic acids.

The $\alpha,\beta$-dibromodihydrocinnamic acid esters useful in the invention are prepared by a two-step process in which cinnamoyl chloride is first reacted with an alcohol to form the cinnamic acid ester of the alcohol, and then the resulting unsaturated ester is brominated by adding bromine at a low temperature to a solution of the unsaturated ester in a solvent such as carbon tetrachloride or chloroform. Suitable alcohols are, for example, the lower alkanols having 1 to 5 carbon atoms, benzyl alcohol, phenol, alkyl-substituted phenols (e.g. cresol, xylenol, 2,4-diisopropylphenol), resorcinol, 4,6-di-tert-butylresorcinol, neopentyl glycol (2,2-dimethyl-1,3-propanediol), dibromoneopentyl glycol (2,2-di(bromomethyl) - 1,3 - propanediol), phloroglucinol, and so forth.

The $\alpha,\beta$-dibromodihydrocinnamyl esters useful in the invention are prepared by a two-step process in which cinnamyl alcohol is reacted with an acid chloride or acid anhydride to form the ester, and the resulting unsaturated ester is brominated as above. Suitable acids are, for example, monocarboxylic acids such as acetic, propionic, butyric, valeric, benzoic and substituted benzoic acids, and the $\alpha,\beta$-unsaturated dicarboxylic acids such as maleic, fumaric, citraconic, and itaconic acids and their anhydrides, and the saturated dicarboxylic acids such as succinic acid.

Self-extinguishing, organic polymer compositions are prepared according to the invention by incorporating the brominated esters of the invention into solid organic polymers normally susceptible to burning such as polyalphaolefins, polyvinylaromatics, and copolymers thereof. Polyalphaolefins which may be rendered self-extinguishing according to the invention include, e.g. polypropylene, poly(pentene-1), poly(butene-1), etc., and copolymers thereof. Polyvinylaromatics which may be rendered self-extinguishing according to the invention include polystyrene, poly(divinylbenzene), poly($\alpha$-methylstyrene), poly(nuclear methylstyrene), poly(chlorostyrene), and copolymers thereof, e.g. styrene-acrylonitrile, styrenebutadiene, and styrene-maleic acid copolymers.

While effective in both foamed and non-foamed polymer, the self-extinguishing agents of the invention have been found to be particularly advantageous for use with polymer foams derived from vinyl aryl polymers such as polystyrene. A convenient form of polystyrene for molding into foamed particles is polystyrene beads prepared in aqueous suspension by a process such as described, for example, in U.S. Pas. No. 2,907,756 wherein a vinyl aryl monomer is polymerized in aqueous suspension in the presence of an initiator system of t-butyl perbenzoate and benzoyl peroxide at a fixed time-temperature cycle using suspending agents to maintain the monomers suspended in the aqueous medium in the form of particles or beads.

The polymer particles prepared by suspension polymerization are rendered expandable by incorporating any suitable blowing agent to the particles either during or after the polymerization. Processes for such incorporation are described in Pat. No. 3,192,169 and Pat. No. 2,983,692. Preferred blowing agents include volatile aliphatic hydrocarbons containing from 1–7 carbon atoms in the molecule, i.e. ethane, methane, propane, butane, pentane, isopentane, hexane, heptane, cyclohexane, and their halogenated derivatives which boil at a temperature below the softening point of the polymer. Usually from about 3–20% by weight of the polymer of the blowing agent is incorporated therein.

In the case where a self-extinguishing agent is to be incorporated into a suspension-prepared polymer, it is desirable to incorporate the agent into the polymer beads while the beads are suspended in the aqueous suspension system. However, the incorporation of bromine containing self-extinguishing agents into polymer beads in aqueous suspension involves an additional problem in that a suitable self-extinguishing agent for use in such a process must be hydrolytically stable so as to not lose bromine via hydrolysis in the aqueous suspension. A large loss of bromine by hydrolysis can introduce sufficient hydrogen bromide into the suspension to cause suspension failure. Surprisingly, the brominated esters of this invention meet the requirement of hydrolytic stability which is entirely unexpected since the bromine atoms of this type compound are usually labile. That is, the bromine atoms are on carbon atoms in an alpha-position to known activating groups, viz. an aromatic ring or a carbonyl group, and, consequently, would be expected to be unstable and hydrolyze readily.

In fact, the brominated ester self-extinguishing agents useful in the invention are remarkably hydrolytically stable under the conditions for polymer impregnation. The reason postulated for this unexpected stability is that the bromine atoms of the brominated esters are located in the molecule such that it is sterically difficult for a water molecule to hydrolyze a bromine atom. It is not intended, of course, that the invention be limited by the postulation, but this hypothesis appears to be substantiated by molecular models of the compounds embraced in the invention.

Generally, the self-extinguishing agents can be incorporated into the polymers by any known technique including adding the self-extinguishing agent to a polymer melt by mixing in conventional blending equipment and then extruding the melt into self-extinguishing polymer pellets which are in a convenient form for molding.

The self-extinguishing agents of the invention are incorporated into the solid organic polymers in an effective amount sufficient to render the polymer self-extinguishing, generally, in amounts of from about 0.1 to 15% by weight, based on polymer. Amounts of about 1.0% or more by weight of polymer of the self-extinguishing agents are required where the self-extinguishing agent is utilized by itself. Where organic peroxide synergists such as dicumylperoxide, 2,5 - dimethyl-2,5-(t - butylperoxy) hexyne-3, di-t-butyl peroxide, and so forth are used in preparing the self-extinguishing compositions, then amounts as small as about 0.1% self-extinguishing agent can be employed. Surprisingly, in many cases the self-extinguishing compounds useful in the invention are effective in low concentrations without the aid of a peroxide synergist.

The invention is further illustrated by the following examples wherein parts are parts by weight unless otherwise indicated.

EXAMPLE I

This example illustrated the general method used to prepare the $\alpha,\beta$-dibromodihydrocinnamic acid esters of the various alcohols. In a 3-necked, 500 ml. flask equipped with a mechanical stirrer, dropping funnel, and condenser exhausted through a nitrogen blanket to a gas-washing bottle, was heated a mixture of 34.7 g. (0.33 mole) neopentyl glycol and 150 ml. benzene. To the warm mixture 111 g. (0.66 mole) cinnamoyl chloride was added gradually over about 2 hours from the dropping funnel while the progress of the reaction was noted by measuring the amount of hydrochloric acid exhausted through the wash bottle. When the theoretical amount of acid had evolved, the pot content was cooled and the solvent removed on a rotary evaporator without the application of external heat. The product diester was dissolved in chloroform, treated with sodium carbonate to remove excess acid, filtered, and used in chloroform solution for the following bromination step.

To a solution of 150 ml. chloroform containing 36 g. (0.1 mole) dicinnamic acid ester of neopentyl glycol was added dropwise over a period of 1.25 hours 32 g. (0.2 mole) bromine (the rate of addition being determined by loss of bromine color) while the temperature was maintained at 20–25° C. with a water bath. After the addition of bromine was completed, the solution was stirred for an additional 2 hours. Solvents were stripped off on a rotary evaporator to give 75 g. of light orange-white solids. Recrystallization from hexane gave a white solid melting at 143–6° C. Infrared and nuclear magnetic resonance analyses indicated the product was pure di($\alpha,\beta$-dibromodihydrocinnamic acid) ester of neopentyl glycol. (Analysis: Br, calculated 46.72%; found 46.45%.) The purified product had remarkable hydrolytic stability, showing only 0.3% bromine content hydrolysis after boiling in water with a dispersing agent for 3 hours. Similar treatment of benzalacetone dibromide (3,4-dibromo-4-phenylbutan-2-one) showed 58% bromine content hydrolysis by contrast.

Similarly prepared starting with cinnamoyl chloride and the appropriate alcohol were the esters and diesters tabulated in Table I. Bromine analysis is given for those esters not previously recorded in the literature.

The only change in procedure necessary to prepare the monoesters shown in the Table I was to start with a 1 to 1 mole ratio of cinnamoyl chloride to alcohol instead of the 2 to 1 ratio used in the example.

TABLE I

[Preparation of esters of $\alpha, \beta$-dibromodihydrocinnamic acid]

| Alcohol | Ester m.p., ° C. | Bromine analysis, percent | |
|---|---|---|---|
| | | Calcd | Found |
| Methanol | 114–15 | (Old) | |
| Ethanol | 73–5 | (Old) | |
| Benzyl alcohol | 97–8.5 | (Old) | |
| Phenol | 127.5–8.5 | (Old) | |
| 2,4-diisopropylphenol | 149 | 34.14 | 34.49 |
| 4,6-di-tert-butylresorcinol (diester) | 204–4.5 | 39.84 | 39.68 |
| Neopentyl glycol (monoester) | 119.5–21 | 40.55 | 40.49 |
| Neopentyl glycol (diester) | 143–6 | 46.72 | 46.53 |
| Dibromoneopentyl glycol (mono ster) | 105–5 | 57.91 | 59.89 |
| Dibromoneopentyl glycol (diester) | 157.5–8.5 | 56.96 | 56.25 |

EXAMPLE II

Illustrative of the method used to prepare the $\alpha,\beta$-dibromodihydrocinnamyl esters of carboxylic acids is the following preparation of $\alpha,\beta$-dibromodihydrocinnamyl benzoate. Thus, 53.4 g. (0.4 mole) cinnamyl alcohol was dissolved in 250–300 ml. redistilled pyridine and stirred while 51 ml. (0.44 mole) benzoyl chloride was added gradually over 35 minutes during which time the temperature rose to 105° C. The product mixture was heated and held at reflux (pot temperature 126° C.) with stirring for an additional hour. The pot content was then poured over 700 g. cracked ice. The solid which separated was filtered out, dissolved in diethyl ether, dried with anhydrous sodium sulfate, and the product recovered by evaporation of the ether. The product was recrystallized to give pure cinnamyl benzoate, melting at 39.5–40.5° C.

A solution of 36.2 g. (0.152 mole) cinnamyl benzoate in 200 ml. chloroform was maintained at 15–20° C. while 9.3 ml. (0.187 mole) bromine was added with stirring over 0.5 hour. Stirring was continued for an additional hour. The product was recrystallized from ether and then from methanol, to give $\alpha,\beta$-dibromodihydrocinnamyl benzoate, melting at 115.5–16.5° C.

Bromination of cinnamyl acetate by the above method gave $\alpha,\beta$-dibromodihydrocinnamyl acetate, melting at 89–90° C.

EXAMPLE III

To illustrate an alternate route to the preparation of the cinnamyl esters of the invention, 33.5 g. (0.25 mole) cinnamyl alcohol was dissolved in 250 ml. chloroform and stirred at 18–21° C. while 40 g. (0.25 mole) bromine was added over 15 minutes. Stirring was continued for an additional 1.5 hours. On evaporation of the solvent, a white, waxy solid was obtained which on recrystallization from hexane gave white needles of $\alpha,\beta$-dibromodihydrocinnamyl alcohol, melting at 74–75.5° C.

A mixture of 29.4 g. (0.1 mole) dibromodihydrocinnamyl alcohol, 4.9 g. (0.05 mole) maleic anhydride, and 0.35 g. p-toluenesulfonic acid was refluxed in 175 ml. toluene for a total of 9 hours during which time a white solid separated. The mixture was cooled, filtered, and the residue dried to give 12.7 g. (38% theory) of off-white solid, melting at 212–17° C. The solid was found by infrared analysis to be primarily the di($\alpha,\beta$-dibromodihydrocinnamyl)ester of fumaric acid. Analysis: Br, 47.85% calculated; 47.84% found.

Similarly prepared was the di($\alpha,\beta$-dibromodihydrocinnamyl)ester of succinic acid, M.P. 195–195.5° C. Analysis: Br, 47.71% calculated; 47.46% found.

EXAMPLE IV

This example demonstrates the self-extinguishing characteristics of expandable polystyrene prepared containing the esters of the present invention. To each of a series of crown-capped bottles was charged 100 parts water, 100 parts polystyrene beads previously prepared by suspension polymerization of styrene monomer, 2.0 parts tricalcium phosphate suspending agent, 0.05 part sodium dodecylbenzenesulfonate, 7.6 parts n-pentane, and the amount of the ester indicated in Table II, below (S.E. agent, pts.). The bottles were sealed and the contents were heated to 115° C. and held at that temperature for 6 hours with constant agitation to maintain suspension of the beads in the aqueous system. After cooling the suspension, the beads containing the self-extinguishing (S.E.) agent were recovered by filtration and washed with water. The recovered beads were then air dried.

The expandable beads were then pre-expanded to a bulk density of 1.0–2.5 pounds per cubic foot and aged for about 12 hours. The pre-expanded product containing the ester S.E. agent was then molded to form a foam block 5" x 5" x ½" having a density of about 2.0 p.c.f. A specimen 1" x 5" x ½" was then hung lengthwise from a clamp over a microburner having a ¾" yellow flame. The flame was positioned ¾" from the bottom edge of the foam sample for 3 seconds. The self-extinguishing properties of the average of five samples is shown in Table II (S.E. vertical burn, sec.) and represents the time from withdrawal of the flame to flame-out of the foam, i.e. it represents the length of time the test sample burned in the absence of the applied flame.

TABLE II

| Expt. No. | S.R. agent, pts. | Synergist,[1] pts. | S.E. vertical burn, sec. |
|---|---|---|---|
| II-1 | Methyl ester, 3.0 | L130, 0.3 | 3.0 |
| II-2 | Ethyl ester, 2.0 | L130, 0.3 | 0.6 |
| II-3 | Benzyl ester, 1.5 | L130, 0.3 | 1.5 |
| II-4 | Neopentyl glycol monoester, 2.0 | Perc, 0.35 | 0.4 |
| II-5 | Neopentyl glycol diester, 1.0 | L101, 0.45 | <0.5 |
| II-6 | Dibromoneopentyl glycol, monoester, 2.0 | Perc, 0.35 | 0.1 |
| II-7 | Dibromoneopentyl glycol, diester, 3.0 | Perc, 0.35 | 0.2 |
| II-8 | 4,6-di-t-butylresorcinyl diester, 2.0 | Perc, 0.35 | 0.6 |
| II-9 | Succinate, 2.0 | Perc, 0.35 | 0.5 |
| II-10 | Fumarate, 2.0 | Perc, 0.35 | 1.4 |

[1] Synergist used was:
L130=2,5-dimethyl-2,5-di(t-butylperoxy)hexyne-3.
L101=2,5-dimethyl-2,3-di(t-butylperoxy)hexane.
Perc=1,3 bis($\alpha$-t-butylperoxyisopropyl)benzene.

EXAMPLE V

To illustrate other methods of adding the S.E. agents to the polystyrene to impart self-extinguishing properties the following series of experiments was undertaken.

Method A.—The S.E. agent and synergist, if used, were dry mixed with polystyrene beads containing blowing agent. When the beads were evenly coated with the S.E. agent, the beads were pre-expanded and molded into a foam block as described in Example IV.

Method B.—The S.E. agent was dissolved in methyl chloride or methylene chloride and the polymer was slurried into the solvent. The solvent was allowed to evaporate to leave a foamed film of the polymer containing the additives.

The films formed by either of the above methods were mounted vertically and ignited in a draft-free hood, the ignition flame removed after 5 seconds, and the average time required for self-extinguishing of the flame noted. The results are shown in Table III.

TABLE III

| Expt. No. | S.E. agent, pts. | Synergist,[1] pts. | Method of addition | S.E. vertical burn, sec. |
|---|---|---|---|---|
| III-1 | Methyl ester, 1.0 | L101, 0.45 | A | 0.9 |
| III-2 | Ethyl ester, 1.5 | Perc, 0.4 | A | 0.5 |
| III-3 | Benzyl ester, 2.0 | L101, 0.45 | A | 0.4 |
| III-4 | Benzyl ester, 1.5 | Perc, 0.8 | B | 0.5 |
| III-5 | Benzyl ester, 2.0 | Perc, 0.8 | B | 0.5 |
| III-6 | do | 0.0 | B | 1.0 |
| III-7 | Phenyl ester, 1.0 | Perc, 0.4 | A | 0.2 |
| III-8 | 2,4-diisopropylphenyl ester, 1.0 | Perc, 0.35 | A | 0.7 |
| III-9 | Neopentyl glycol, monoester, 2.0 | Perc, 0.4 | A | <0.5 |
| III-10 | Neopentyl glycol, diester, 2.0 | 0.0 | B | 0.5 |
| III-11 | do | Perc, 0.8 | B | 0.5 |
| III-12 | Dibromoneopentyl glycol, monoester, 1.5 | Perc, 0.4 | A | 0.9 |
| III-13 | Dibromoneopentyl glycol, diester, 2.0 | Perc, 0.4 | A | 0.0 |
| III-14 | Acetate, 2.0 | Perc, 0.35 | A | 4.6 |
| III-15 | Benzoate, 3.0 | Perc, 0.4 | A | 0.5 |

[1] Synergist used is:
L101=2,5-dimethyl-2,5-di(t-butylperoxy)hexane.
Perc=1,3-bis($\alpha$-t-butylperoxyisopropyl)benzene.

EXAMPLE VI

To illustrate other organic polymers which may be rendered self-extinguishing by the instant brominated esters, the various polymers listed in Table IV and the amounts of the ester indicated were combined by the designated method and the resulting films tested for self-extinguishing times. The results are tabulated in Table IV.

TABLE IV

| Expt. No. | Polymer | S.E. agent, percent | Synergist,[1] percent | Method of addition[2] | S.E. vertical burn, sec. |
|---|---|---|---|---|---|
| IV-1 | Polypropylene | Phenyl ester, 5.0 | 0.0 | M | <1.0 |
| IV-2 | do | do | Perc, 0.4 | M | 1.0 |
| IV-3 | do | Neopentyl glycol diester, 5.0 | 0.0 | M | <1.0 |
| IV-4 | do | do | Perc, 0.4 | M | 3.0 |
| IV-5 | do | Dibromoneopentyl glycol, diester, 5.0 | 0.0 | M | <0.5 |
| IV-6 | do | do | Perc, 0.4 | M | <1.0 |
| IV-7 | do | Fumarate, 5.0 | 0.0 | M | <1.0 |
| IV-8 | do | do | Perc, 0.35 | M | <1.0 |
| IV-9 | do | Succinate, 5.0 | 0.0 | M | <1.0 |
| IV-10 | do | do | Perc, 0.35 | M | <1.0 |
| IV-11 | Styrene (71%), acrylonitrile (29%) copolymer | Benzyl ester, 2.5 | Perc, 0.8 | C | 0.5 |
| IV-12 | do | Benzyl ester, 5.0 | 0.0 | C | 0.5 |
| IV-13 | do | do | Perc, 0.8 | C | 0.5 |
| IV-14 | do | Neopentyl glycol diester, 5.0 | 0.0 | C | 1.0 |
| IV-15 | do | do | Perc, 0.8 | C | 0.5 |
| IV-16 | Styrene (90%), maleic anhydride (10%) copolymer | Benzyl ester, 5.0 | 0.0 | C | 0.5 |
| IV-17 | do | do | Perc, 0.4 | C | 0.5 |
| IV-18 | do | Neopentyl glycol diester, 5.0 | 0.0 | C | 0.5 |
| IV-19 | do | do | Perc, 0.4 | C | 0.5 |
| IV-20 | Styrene (94%), methyl acid maleate (6%) copolymer | Benzyl ester, 5.0 | 0.0 | C | 1.0 |
| IV-21 | do | do | Perc, 0.8 | C | 0.5 |
| IV-22 | do | Phenyl ester, 5.0 | 0.0 | I | 3.7 |
| IV-23 | do | do | Perc, 0.4 | I | 1.0 |
| IV-24 | do | Neopentyl glycol diester, 5.0 | 0.0 | C | 0.5 |
| IV-25 | do | do | Perc, 0.8 | C | 0.5 |

[1] Synergist used was: Perc=1,3-bis($\alpha$-t-butylperoxyisopropyl)benzene.
[2] Method of Addition was:
M=Mixed in with repeated pressings on compression press.
C=Method B of Example V.
I=Method of Example IV.

In addition to providing self-extinguishing properties to the polymer compositions, the S.E. agent esters of this invention impart anti-lumping and anti-static properties to expandable polystyrene prepuff materials and help these materials to fuse together upon being molded.

What is claimed is:

1. A self-extinguishing polyvinylaromatic composition comprising a vinyl aromatic polymer, and 0.1 to 15% by weight of said polymer of an ester selected from the group consisting of
   (a) $\alpha,\beta$-dibromodihydrocinnamic acid esters of alkanols having 1 to 5 carbon atoms, benzyl alcohol, phenol or alkyl-substituted phenols;
   (b) mono- and di($\alpha,\beta$-dibromodihydrocinnamic acid) esters of neopentyl glycol, dibromoneopentyl glycol, resorcinol, or alkyl-substituted resorcinols; and
   (c) mono-, di-, and tri($\alpha,\beta$-dibromodihydrocinnamic acid) esters of trihydroxybenzenes.

2. A composition of claim 1 wherein said vinyl aromatic polymer contains 2 to 20% by weight of an organic blowing agent.

3. Self-extinguishing polymer foams prepared by heating the compositions of claim 1.

4. The composition of claim 1 wherein said vinyl aromatic polymer is polystyrene.

5. The composition of claim 1 wherein said vinyl aromatic polymer is a copolymer of styrene with a minor amount of a monomer selected from the group consisting of acrylonitrile, maleic anhydride, and methyl acid maleate.

6. The composition of claim 1 wherein said composition contains from about 0.1 to 2% by weight based on said polymer of an organic peroxide synergist.

7. The composition of claim 6 wherein said vinyl aromatic polymer is polystyrene.

8. The composition of claim 6 wherein said vinyl aromatic polymer is a copolymer of styrene with a minor amount of a monomer selected from the group consisting of acrylonitrile, maleic anhydride, and methyl acid maleate.

9. The composition of claim 6 wherein said vinyl aromatic polymer contains 2 to 20% by weight of an organic blowing agent.

10. Self-extinguishing polymer foams prepared by heating the composition of claim 9.

11. A self-extinguishing poly(alpha-olefin) composition comprising an alpha-olefin polymer, and from 0.1 to 15% by weight of said polymer of an ester selected from the group consisting of
   (a) $\alpha,\beta$-dibromodihydrocinnamic acid esters of alkanols having 1 to 5 carbon atoms, benzyl alcohol, phenol or alkyl-substituted phenols;
   (b) mono- and di($\alpha,\beta$-dibromodihydrocinnamic acid) esters of neopentyl glycol, dibromoneopentyl glycol, resorcinol or alkyl-substituted resorcinols; and
   (c) mono-, di-, and tri($\alpha,\beta$-dibromodihydrocinnamic acid) esters of trihydroxybenzenes.

12. The composition of claim 11 wherein said alpha-olefin polymer is propylene.

13. The composition of claim 11 wherein said composition contains from about 0.1 to 2% by weight based on said polymer of an organic peroxide synergist.

14. The composition of claim 13 wherein said alpha-olefin polymer is polypropylene.

15. The composition of claim 1 wherein said ester is selected from the group consisting of methyl $\alpha,\beta$-dibromodihydrocinnamate,
ethyl $\alpha,\beta$-dibromodihydrocinnamate,
benzyl $\alpha,\beta$-dibromodihydrocinnamate,
phenyl $\alpha,\beta$-dibromodihydrocinnamate,
2,4-diisopropylphenyl $\alpha,\beta$-dibromodihydrocinnamate,
4,6-di-tert-butyl-1,3-phenylene bis($\alpha,\beta$-dibromodihydrocinnamate),
neopentyl glycol mono-$\alpha,\beta$-dibromodihydrocinnamate,
neopentyl glycol di($\alpha,\beta$-dibromodihydrocinnamate),
dibromoneopentyl glycol mono-$\alpha,\beta$-dibromodihydrocinnamate,
dibromoneopentyl glycol di($\alpha,\beta$-dibromodihydrocinnamate).

References Cited

UNITED STATES PATENTS

| | | | |
|---|---|---|---|
| 3,401,127 | 9/1968 | Stephenson | 260—2.5 FP |
| 3,326,832 | 6/1967 | Rauschenbach et al. | 260—2.5 FP |
| 3,269,962 | 8/1966 | Eichhorn | 260—2.5 FP |
| 3,058,928 | 10/1962 | Eichhorn et al. | 260—2.5 FP |
| 3,210,326 | 10/1965 | Tousignant et al. | 260—2.5 FP |
| 3,151,183 | 9/1964 | Bill et al | 260—485 H |
| 3,267,070 | 8/1966 | Tousignant | 260—476 R |

MURRAY TILLMAN, Primary Examiner

M. FOELAK, Assistant Examiner

U.S. Cl. X.R.

260—2.5 B, 45.85 R, 476 R, 485 H, 488 CD